Patented Dec. 10, 1935

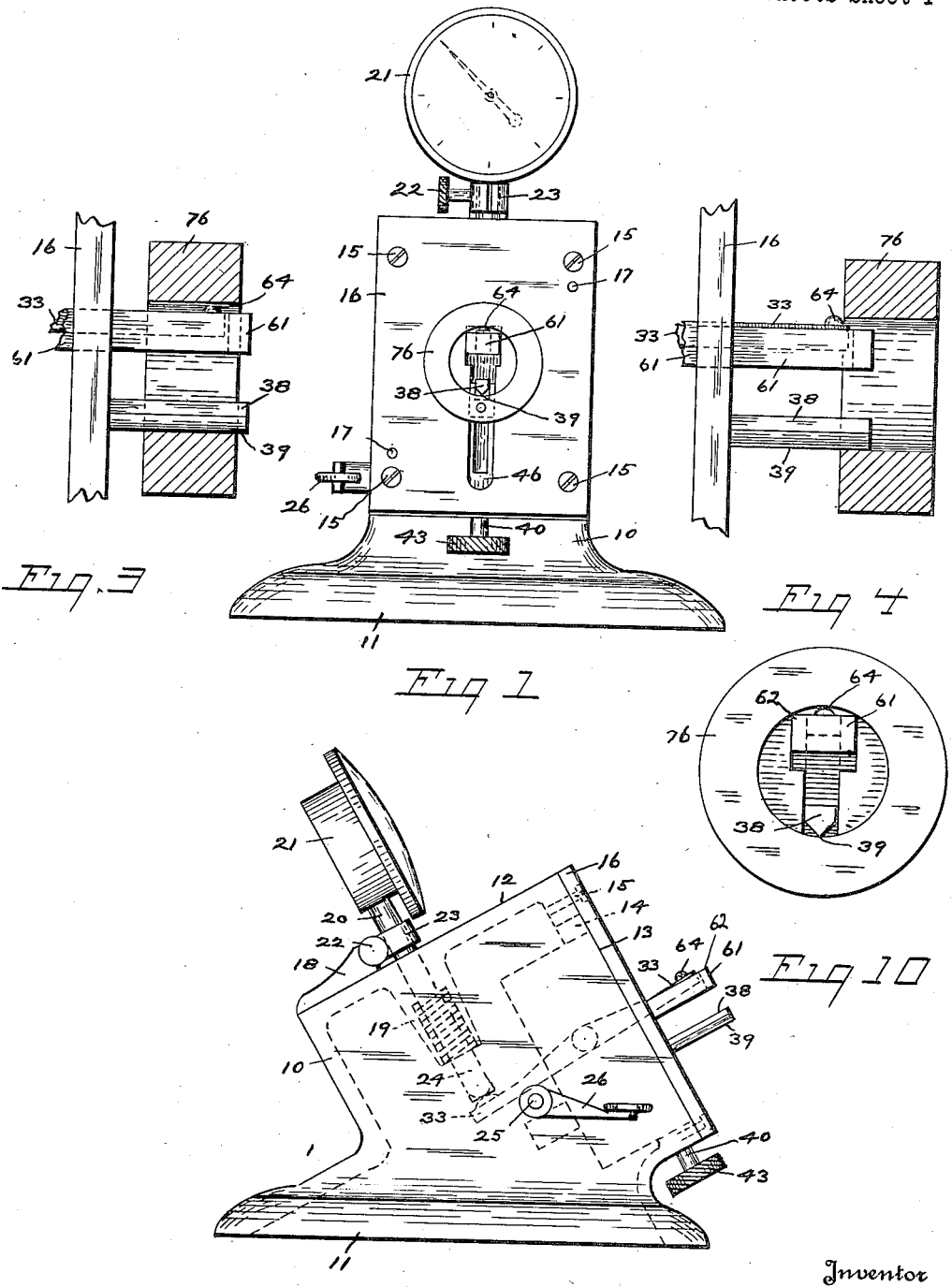

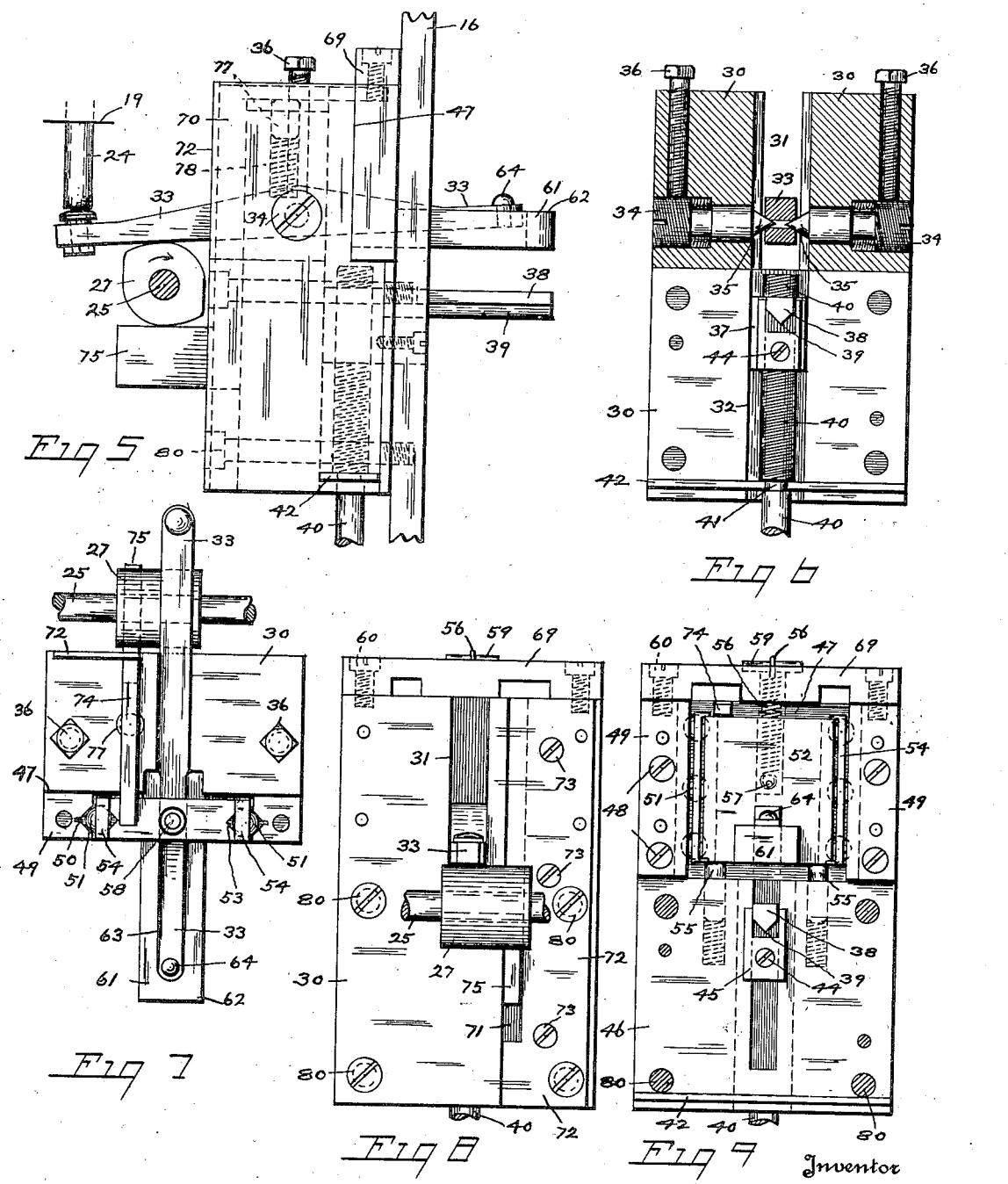

2,024,020

UNITED STATES PATENT OFFICE 2,024,020

DIMENSION GAUGE

Erik H. Aldeborgh, Poughkeepsie, N. Y., assignor to Standard Gage Company, Inc., Poughkeepsie, N. Y., a corporation of New York Application January 22, 1931, Serial No. 510,352

4 Claims. (Cl. 33—178)

This invention relates to a dimension gauge of that type which is employed for the measurement and checking of bores and internal dimensions of pieces of work such as rings, etc.

The device is employed in connection with a dial indicator for direct reading of the measurements, and may be used for checking and comparing the sizes, roundness and taper of internal surfaces, either round, or of other shapes.

In instruments now in use for this purpose, the gauging means is also employed as one of the work holding and centering means, whereby not only is the gauging means less sensitive but the work is brought into contact with the gauging means before it is fully alined and centered, thus in many cases not giving a true reading, and further tapers and out-of-roundness can not be readily shown.

The object of the present invention is to provide a gauge of this class wherein the work to be measured or checked is mounted upon a self alining support, where the work is first alined and centered before being brought into contact with the gauging means.

Another object of the invention is to provide a sturdy construction and one in which the work supporting members and the gauging member are rigidly supported and yet have free movement combined with ease of adjustment and operation, there being no lost motion or vibration in any of the moving parts.

Another object is to provide a gauge of this type that shall be capable of rapid production inspection of production work.

A further object of the invention is to provide a device of this kind whereby a base or mounting means is provided on which is mounted a dial indicator, and novel mechanism provided whereby the work to be checked is placed upon a three point or line retaining means, composed of a stationary but adjustable supporting arm, and a movable arm mounted in parallel relation thereto and capable of movement by the operator during the insertion and removal of the work piece, and normally held in contact with the internal surface of the work; the work being capable of being slid on or off of the same and also rotated thereon; said retaining means being self alining and always centering the work thereon. The gauging means being independent of the holding means, and having free action and adapted to be brought into contact with the internal surface of the work after the same has been mounted on the retaining means and alined, the measurement which is indicated being an accurate diameter, and by sliding the work in or out on the holding means, any taper is indicated, and by rotating the same, any out-of-roundness is also shown by the hand of the dial indicator.

With these and other objects in view, my invention consists in certain novel construction and combination of parts as will hereinafter be fully described and claimed, and illustrated in the accompanying drawings, which form a part hereof and in which like figures of reference refer to corresponding parts in all of the views, but it is understood that slight changes may be made without departing from the spirit of the invention.

In the drawings—

Figure 1 shows a front view of a dimension gauge in which is embodied my invention, and shows the same with a piece or article in the act of being checked as to its internal dimension and for roundness.

Figure 2 shows a side elevation of the same, with the article removed.

Figure 3 is an enlarged partial view of the work supports, and showing in section, an article or ring being checked.

Figure 4 is a similar view, but showing the ring alined upon the work supports before being checked.

Figure 5 is a side elevation of the operating unit removed from the case.

Figure 6 is a front view of the same, partly in section, and with the face plate removed, and side plate removed.

Figure 7 is a top plan view of the operating unit, without the face plate.

Figure 8 is a rear view of said unit, showing the cam for operating the levers.

Figure 9 is a front view of the unit with the face plate removed.

Fig. 10 is an enlarged front view of the piece or article in the act of being checked as to its internal dimensions and for roundness.

Referring to the drawings—

I have shown a suitable casing 10, formed with a base 11, and an inclined top 12 and front 13; said front edges 14, being provided with tapped holes to receive the attaching screws 15 which hold the face plate 16 in place on the dowel pins 17.

The top 12 is provided with a boss 18 which is alined with an internal boss 19; both of which are bored to receive the stem 20 of a dial indicator 21, which is held in place by a thumb screw 22 in the slotted collar 23; while the operating spindle of the dial indicator is in contact with and operated by a plunger 24 mounted in the boss 19.

Said casing 10 is also provided with a transverse shaft 25, extending through one or both sides thereof and having secured thereon, without the case, a finger lever 26, and secured thereon, within the casing, a cam 27.

The operating unit, comprises a block 30, which is formed with a transverse slot 31, extending from the top to a point about midway its length, and communicating with a vertical slot 32 formed in the front face thereof, both of which are shown in Figure 6.

Within the slot or opening 31, is pivoted a gauging bar 33, on the two adjustable pivot plugs 34, which are threaded into said block 30 at right angles to said opening 31; said plugs 34 being formed with the conical points 35, and locked in place by the set screws 36 which are also threaded in said block 30; this construction providing a point mounting for the gauging bar 33.

Within the slot or guide way 32 is mounted a slide 37, which is formed with a projecting arm 38 integral therewith, and formed with a downwardly projecting knife edge 39; said slide 37 having a vertical threaded hole within which is mounted an adjusting screw 40, the lower end of which is notched as at 41 for a locking plate 42 mounted in a slot in the block 30 near the bottom thereof; the lower end of said adjusting screw 40 extending below the face plate 16 and provided with a knurled head 43.

The front face of said slide 37 is also tapped for a screw 44 which holds in place a locking plate 45, which is clamped down by said screw 44 upon the face of the cover plate 46 which is placed on the lower part of the face of the block 30 and which is formed with an opening through which the arm 38 may be moved up or down for adjustment, this plate 46 also serving to hold the adjusting screw locking plate 42 in place.

The upper face of the block 30 is cut back as at 47, and to the face thereof are secured by the dowel pins and the screws 48 the two vertical guide strips 49 which are formed with the races 50 for the balls 51; while between said guides 49 is mounted a slide 52 which is also formed with races 53 for the balls 51, while between said slide 52 and the guides 49 are mounted on the slide 52 a pair of ball retainers 54 for separating the balls.

Said slide 52 is retained in a normally raised position both by having its lower edge resting upon two spring actuated plungers 55 mounted in the block 30, and by a spring 56, the lower end of which is secured by a pin 57 in a hole 58 formed in said slide 52, while the upper end of the spring 56 is engaged by a pin 59 resting against the upper face of the bridge bar 69 which is connected to the guides 49 by the screws 60; the spring 56 passing through a hole formed in said bridge bar 59; and in this manner the slide 52 has a free vertical movement against the spring pressure, and is very rigid and has no lateral movement in any direction.

Said slide 52 is formed with a work locating arm 61 which is integral therewith and projects forward from the face thereof; said arm 61, having two knife edges 62 which with the knife edge 39 of the arm 38, provide a three edge adjustable self alining support for the work.

Said arm 61 and slide 52 are also formed with a central opening 63 within which freely moves the gauging arm 33, with its contact 64, giving a true measurement between the contact 64 and the knife edge 39.

For operating the work locating arm 61 and its slide member 52 to close up the work locating edges to allow of the insertion and removal of the work to be gauged, the slide 52 is moved downward against the action of the spring 56 and spring actuated plungers 55, by a Z-shaped arm 70 which is slidably mounted in a slot 71 which is formed in the back of the block 30 and partly closed by a cover plate 72 secured thereon by the screws 73; said cover plate 72 allowing the arm 70 to be moved up or down; the upper part 74 of said arm 70 extending over and contacting with the upper edge of the slide 52; while the lower end 75 projects rearwardly from the block 30 and below the shaft 25, and is engaged by the cam 27, which also engages the rear portion of the bar 33, in such a manner that by depressing the finger lever 26 the cam 27 will be moved and by the shape of its face, will depress the end 75 of the Z-shaped arm 70, and raise the rear end of the bar 33, which being mounted on the pivots 35 will depress the front end which carries the contact point 64, at the same time that the arm 61 is depressed to bring the arm 61 and the arm 38 closer together, while the instant that pressure is released from the finger lever 26, the arms 61 and 38 will move apart engaging the inner diameter or bore of the work 76.

The Z-shaped arm 70 is held in a normally raised position by a plunger 77 resting upon a spring 78 in a hole in the block 30 at a point below the upper part 74.

In the operation of the device, a master gauge 35 of the desired bore is placed on the work supports 61 and 38, and the adjustable supporting arm 38 is adjusted by the screw 40 to provide the proper tension of the arm 61 in contact with the bore of the gauge, and the dial indicator is set for the desired reading.

The finger lever 26 is then depressed to bring said work supporting arms slightly closer together; the gauge is then removed, and a piece of work to be checked is then inserted on said arms, the finger lever released, allowing the arm 61 to raise, which will at once aline the work on the three edge contacts as shown on Figure 4, and as the work 76 is further slid upon the arms 61 and 38, it will strike against and depress the contact 64 on the gauging arm 33, as shown in Figure 3; the rear end of the bar 33 being in contact with the plunger 24 will operate the dial indicator to give a reading of the distance between the contact 64 and the knife edge 39, which is the diameter of the bore of the work 76, and by turning or rotating the work, any variation both as to taper and roundness in the bore or hole in the work will be directly indicated by the hand of the dial indicator.

The work supporting arms always aline the work thereon and before the gauging contact is brought into contact with the bore.

The block 30 is secured to the face plate 16 by the screws 80.

Having thus described my invention, what I claim as new and desire to secure by Letters Patent, is—

1. In a dimension gauge of the class described and in combination with a casing, a face plate and a dial indicator mounted thereon, of work supporting and self alining means mounted within said casing and projecting from said face plate, and comprising a combined gauging and alining adjustable arm and an alining arm in parallel relation therewith, means for adjusting said combined gauging and alining arm, means for moving said alining arm with respect to the adjustable arm, said arms providing a three line centering and alining means for the work, and a gauging means adapted to contact both with the work and with the operating plunger of the dial indicator and having free movement with respect to the supporting and alining arms.

2. In a dimension gauge of the class described and in combination with a casing, a face plate and a dial indicator mounted thereon, of a combined work supporting and gauging arm adjustably mounted within said casing and projecting from said face plate and means for adjusting said arm, a second alining and supporting arm also adjustably mounted within said casing and projecting from the face plate and parallel to the first arm, means for normally retaining said second arm in a raised position, and manually operated means for lowering said arm and bringing said supporting arms nearer together for the insertion and removal of the work, a gauging arm pivoted within said casing and having one end projecting from said face plate and adapted to contact with the work and the other end in contact with and adapted to operate the dial indicator.

3. In a dimension gauge of the class described and in combination with a casing, a face plate and a dial indicator mounted thereon, a stationary arm and an adjustable combined gauging and alining arm mounted within said casing and projecting from said face plate and means for adjusting the same, a second alining arm mounted on frictionless bearings within said casing and projecting from said face plate and in parallel relation to the first alining arm, said second alining arm adapted to have movement with relation to the first arm, means for normally retaining said arm in a raised position and means for lowering the same, said second arm being formed with an opening therein, a gauging bar pivoted within said base and projecting from said face plate within the opening in said second arm and adapted to contact with the surface of the work and operate the dial indicator.

4. In a dimension gauge of the class described and in combination with a casing, a face plate and a dial indicator mounted thereon, of work supporting and self alining means projecting from said face plate, comprising an adjustable arm formed with an alining edge and a second movable alining arm formed with two alining edges and a central opening, means for adjusting the first arm, means for moving the second arm in parallel relation with the first arm comprising a slide integral therewith and mounted in frictionless bearings, means for normally holding said slide in a raised position and finger operated means for lowering said slide to bring the alining arms nearer together to receive the work, a gauging arm having a gauging contact and pivoted within said casing with its forward portion adapted for free movement within the opening in the second alining arm and adapted to contact with the work after the same is alined, the rear portion of said gauging arm being adapted to operate the dial indicator.

ERIK H. ALDEBORGH.